(12) United States Patent
Hotta et al.

(10) Patent No.: US 7,914,073 B2
(45) Date of Patent: Mar. 29, 2011

(54) SLIDER STRUCTURE OF SUNROOF APPARATUS

(75) Inventors: Kouichi Hotta, Tochigi (JP); Teruyuki Nakamura, Tochigi (JP); Tatsuaki Uehara, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 163 days.

(21) Appl. No.: 12/362,166

(22) Filed: Jan. 29, 2009

(65) Prior Publication Data

US 2009/0212603 A1 Aug. 27, 2009

(30) Foreign Application Priority Data

Feb. 26, 2008 (JP) ................................. 2008-044118

(51) Int. Cl.
*B60J 7/057* (2006.01)
*B60J 7/05* (2006.01)

(52) U.S. Cl. .................... 296/223; 296/216.08; 296/221

(58) Field of Classification Search .................. 296/221, 296/222, 223, 216.08
See application file for complete search history.

(56) References Cited

U.S. PATENT DOCUMENTS

| | | | | |
|---|---|---|---|---|
| 5,765,908 A | * | 6/1998 | Kelm | 296/223 |
| 2001/0026085 A1 | * | 10/2001 | Farmont et al. | 296/223 |

FOREIGN PATENT DOCUMENTS

| | | |
|---|---|---|
| JP | 2001-146114 A | 5/2001 |
| JP | 2003-211966 A | 7/2003 |

* cited by examiner

*Primary Examiner* — Dennis H Pedder
(74) *Attorney, Agent, or Firm* — Arent Fox LLP

(57) ABSTRACT

According to a slider structure of a sunroof apparatus, the apparatus includes: a roof panel attached to an opening of a fixed roof; a panel support stay, where a cam groove is formed, is fixed to a side edge of the roof panel; and a slider that moves along a guide rail, is engaged with the cam groove through a pin, and tilts and slides the roof panel, wherein the slider structure includes: a pair of lifters that interpose the panel support stay, are divided, and are engaged with the cam groove through the pin; and a pair of slide shoes that are attached to the lifters, respectively, are connected with each other, integrate the lifters, and are slid on the guide rail.

3 Claims, 5 Drawing Sheets

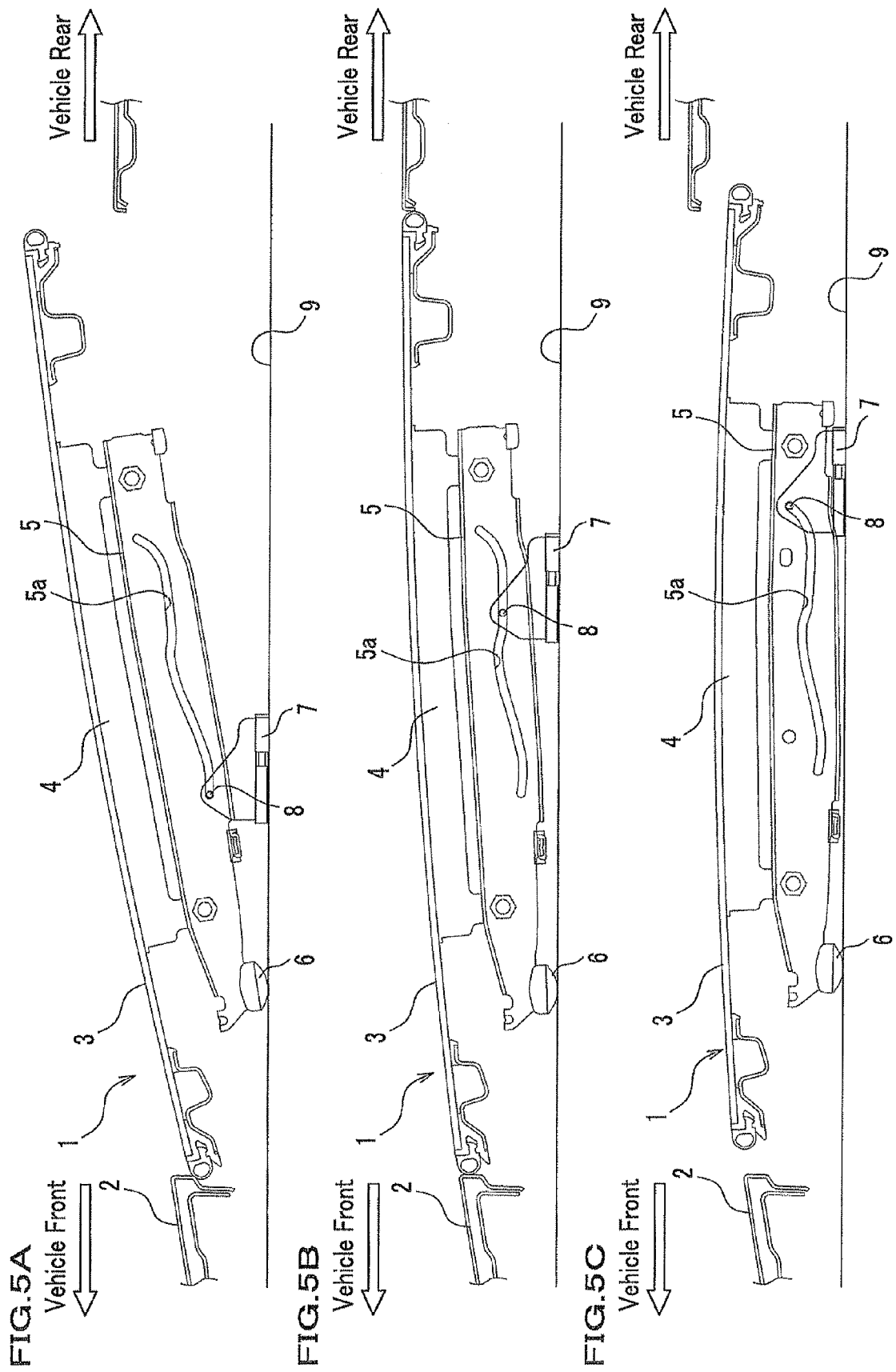

SLIDER STRUCTURE OF SUNROOF APPARATUS

REARGROUND OF THE INVENTION

1. Field of the Invention

The present invention relates to a slider structure having a tilt-slide function of a roof panel in a sunroof apparatus.

2. Description of the Related Art

In a sunroof apparatus of a vehicle, such a sunroof apparatus described in Japanese Patent Laid-Open Publication No. 2001-146114 (hereinafter referred to as JP 2001-146114) is cited as a conventional example of a so called tilt-slide sunroof apparatus where a roof panel is tilted up or down, and thereby, is made to slide forward or rearward.

In JP 2001-146114 is described the sunroof apparatus including: a pair of link plates that interpose a bracket fixed to a sliding roof and join a first guide groove formed in the bracket through a pin; and a drive shoe that free-rotatably supports the link plates and slides in a guide rail tilting and sliding the sliding roof through a cam action between the link plates and the first guide groove by the drive shoe sliding.

A function of surely supporting a lifter (link plate in JP 2001-146114) connected with a sliding roof and a function of smoothly sliding in a guide rail are required for a slide shoe (drive shoe in JP 2001-146114) sliding in a guide rail with less jounce; a shape of the slide shoe is designed so that these functions are not damaged. When a push-pull cable is attached as the drive shoe as in JP 2001-146114, designing is performed by also considering the attached portion of the cable.

However, because the section space of the guide rail where the slide shoe is housed is narrow, there is a problem that if the above design requirements are intended to be met, the whole shape of the slide shoe tends to become complicated. If the shape of the slide shoe is complicated, a mold for forming the shoe is complicated, and it is a factor of increasing manufacturing cost.

Consequently, there is a need for the slide structure of a sunroof apparatus where the support function of its lifter and the sliding function of its slide shoe are compatible, and further, which can reduce manufacturing cost.

SUMMARY OF THE INVENTION

With respect to a slider structure of a sunroof apparatus according to the present invention, in order to solve the problem, the apparatus comprises a roof panel attached to an opening of a fixed roof; a panel support stay, where a cam groove is formed, is fixed to a side edge of the roof panel; and a slider that moves along a guide rail, is engaged with the cam groove through a pin, and tilts and slides the roof panel, wherein the slider structure comprises: a pair of lifters that interpose the panel support stay, are divided, and are engage with the cam groove through the pin; and a pair of slide shoes that are attached to the lifters, respectively, are connected with each other, integrate the lifters, and are slid on the guide rail.

Even if a slide space is narrow in a guide rail and a section shape of the space is complicated, a pair of slide shoes is configured to be divided and connected with each other, and to integrate both lifters; thereby, a shape of each of the slide shoes is simplified and it is easy to manufacture the slide shoes.

Furthermore, in the invention a slider structure of a sunroof apparatus is configured so that: in each of the lifters is formed a plate-like shoe connection portion extended in a horizontal direction; in each of the slide shoes is formed a lifter fixing hole where the shoe connection portion is horizontally inserted and fixed; and in the lifter fixing hole of at least one slide shoe is provided a bending space for releasing a bending in an up-and-down direction of the slide shoe and caused by contact with the guide rail.

In order to achieve smooth slidability while preventing a jounce of a slide shoe, an elastic portion always contacted with the guide rail by pressure is integrally formed in the slide shoe in many cases. By providing in a lifter fixing hole the elastic portion for releasing a bending in the up-and-down direction of the slide shoe, it is possible to thin the slide shoe without damaging the function of the elastic portion.

According to the present invention, because the shape of each slide shoe is simplified, manufacturing the slide shoe is easy and it is possible to reduce manufacturing cost relating to the slider.

BRIEF DESCRIPTION OF THE DRAWINGS

FIGS. 5A, 5B, and 5C are operation explanation drawings of the sunroof apparatus.

BEST MODE FOR CARRYING OUT THE INVENTION

Figure 1:
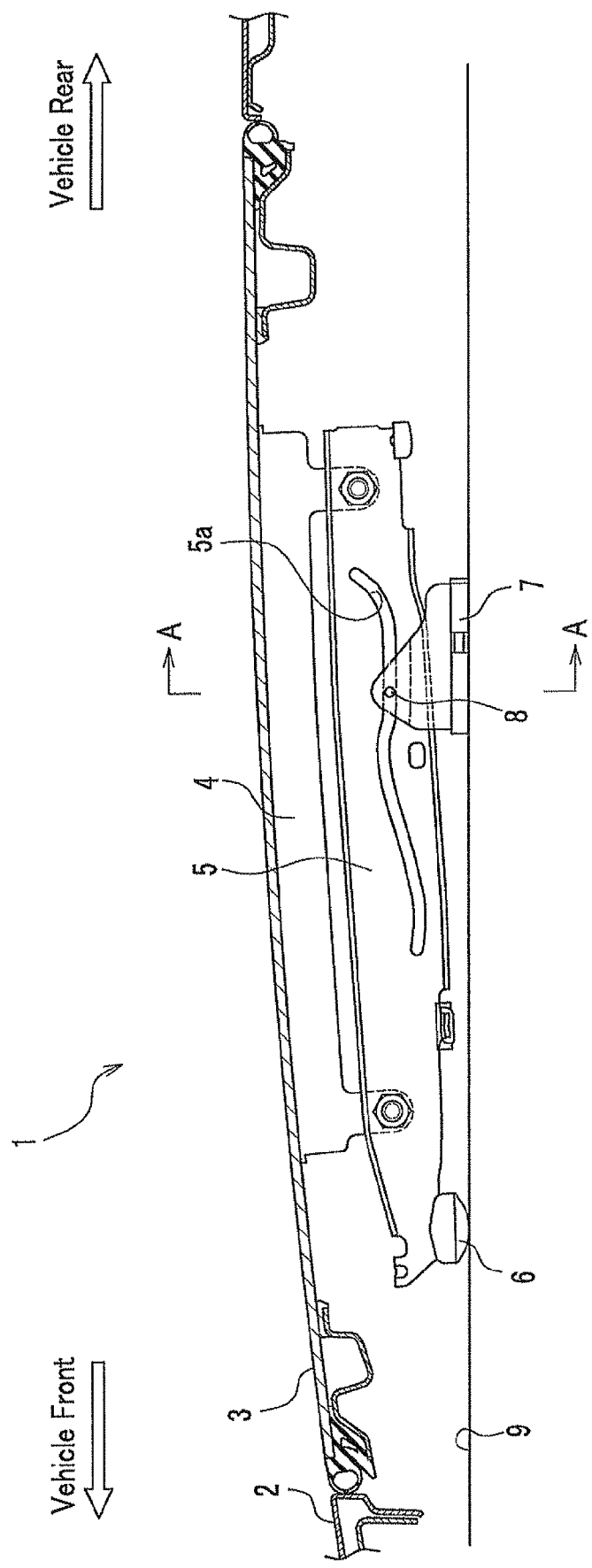
FIG. 1 is a side view of a sunroof apparatus according to the present invention.
Figure 2:
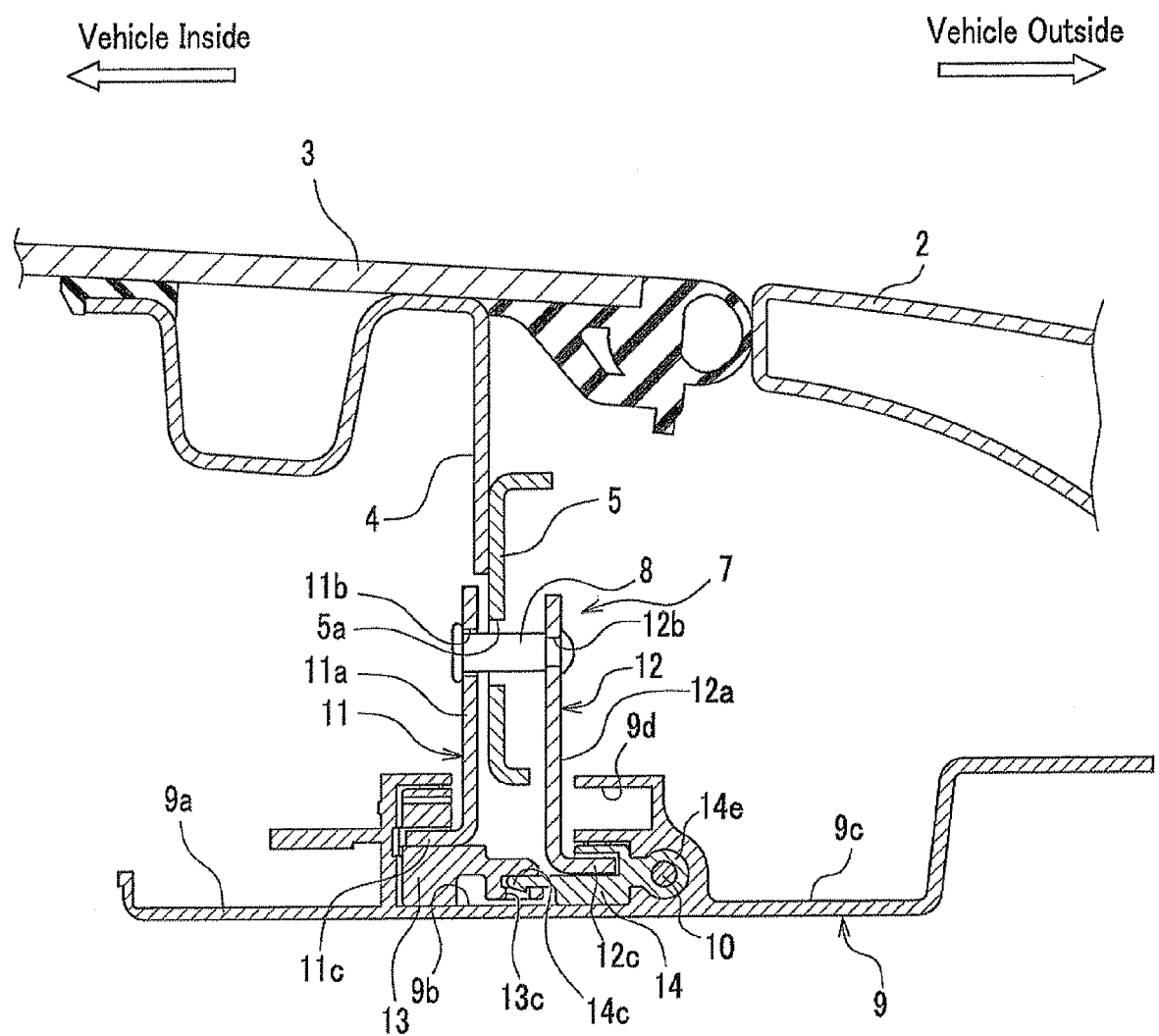
FIG. 2 is an A-A section view of FIG. 1.

As shown in FIGS. 1 and 2, a sunroof apparatus 1 comprises a roof panel 3 attached to an opening of a fixed roof 2, and in an embodiment of the invention, the apparatus comprises the panel 3 of a so called inner-slide type that can be tilted up and slide rearward in a state of being tilted down. The roof panel 3 is configured to be a panel made of, for example, glass.

On a lower face of the roof panel 3 is fixed a bracket 4, and to the bracket 4, by a bolt fastening and the like, is fixed a panel support stay 5 having a vertical face extended in a front-to-rear direction of a vehicle. On the vertical face of the panel support stay 5 is formed a cam groove 5a penetrating left to right; to a front end of the stay 5 is attached a driven slider 6 where a lower face in contact with a guide rail 9 described later is formed like an arc. Although a description of a specific structure of the driven slider 6 is omitted here, it is configured to be, for example, a resin made member, and a lower face of the slider is configured to be elastically deformable, corresponding to a slight deviation in an up-to-down direction and accompanying with the tilt operation of the roof panel 3.

An engagement pin 8 of a drive slider 7 is engaged with the cam groove 5a of the panel support stay 5. The guide rail is arranged along the front-rear direction of the vehicle below a side portion of the opening of the fixed roof 2, and a push-pull cable 10 (FIG. 2) is connected to the drive slider 7; the cable 10 is pushed and pulled by a drive source not shown, and thereby, the drive slider 7 and the driven slider 6 are guided by the guide rail 9 and are slid in the front-to-rear direction of the vehicle.

The guide rail 9 is configured, for example, by an extrusion mold material of an aluminum alloy. As an example of a section structure of the guide rail 9, in order from a vehicle-center near side as shown in FIG. 2 are formed a sunshade guide portion 9a for guiding the slider of a sunshade not shown; a roof panel guide portion 9b for guiding the slide of the drive slider 7 and the driven slider 6; and a drain 9c.

FIGS. 5A, 5B, and 5C are operation explanation drawings of the sunroof 1. FIG. 5B shows a state of the roof panel 3 being closed, and the engagement pin 8 is positioned at around middle of the cam groove 5a. When the drive slider 7 is slid toward a vehicle front side by the push-pull cable 10 (FIG. 2), and the engagement pin 8 moves near front of the cam groove 5a, the roof panel 3 is tilted up by receiving a cam action as shown in FIG. 5A. When the drive slider 7 is slid toward a vehicle rear side, and the engagement pin 8 moves near rear of the cam groove 5a, the roof panel 3 is tilted down by receiving a cam action; and when the slider 7 is further slid rearward, the panel 3 moves rearward in a state of being tilted down as shown in FIG. 5C.

Figure 3:
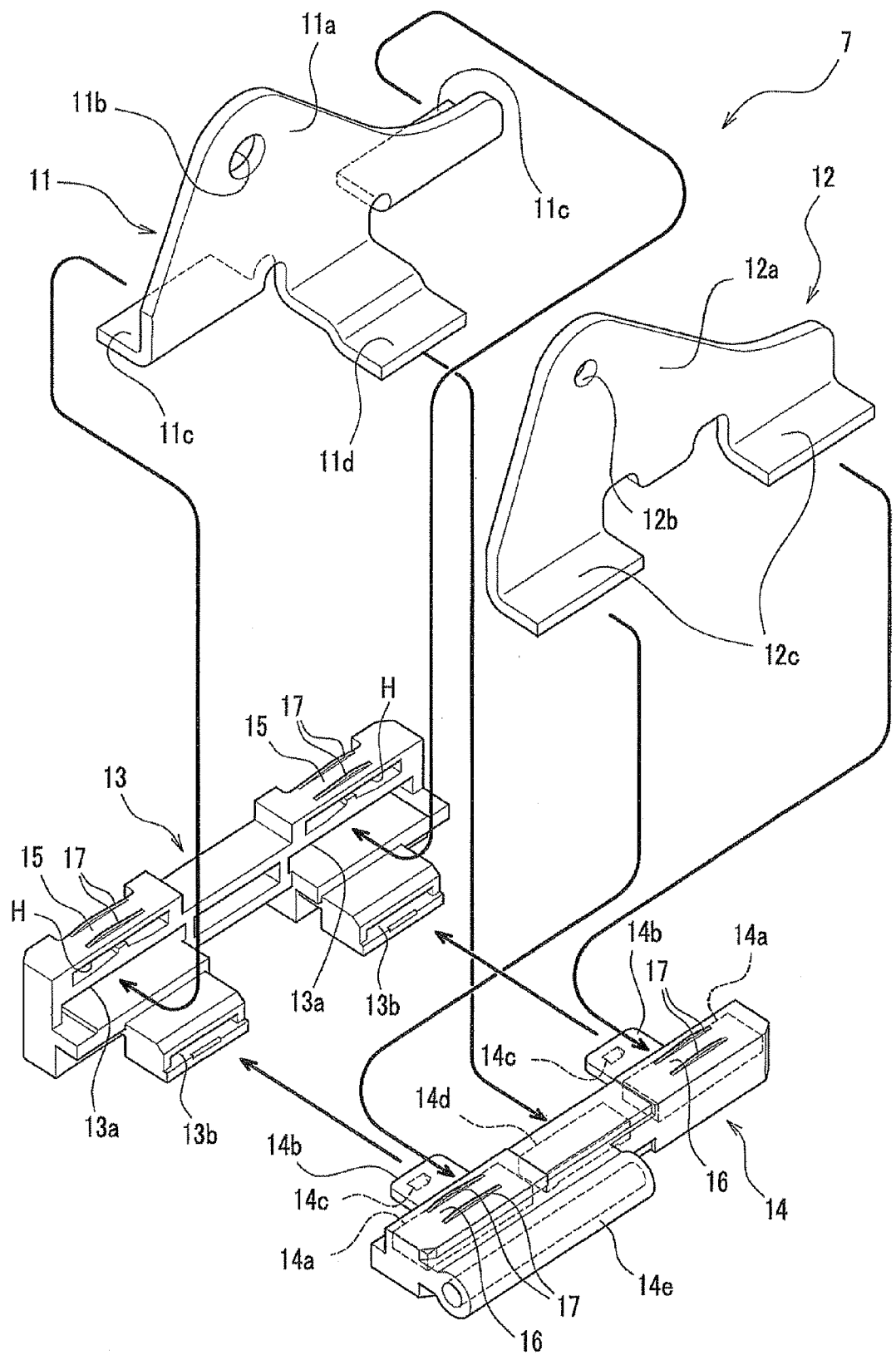
FIG. 3 is an exploded perspective view of a drive slider.

Here will be described a specific structure of the drive slider 7 of the invention. FIG. 3 is an exploded perspective view of the drive slider 7. In reference with FIGS. 2 and 3, the drive slider 7 interposes the panel support stay 5, is divided, and comprises: a pair of lifters 11, 12 engaged with the cam groove 5a through the pin 8; and a pair of slide shoes 13, 14 that are attached to the lifters 11, 12, respectively, are connected with each other, integrate the lifters 11, 12, and are slid on the guide rail 9. The lifter 11 and the slide shoe 13 are positioned near a vehicle inside in a vehicle width direction; the lifter 12 and the slide shoe 14 are positioned near a vehicle outside in the vehicle width direction.

As shown in FIG. 2, the engagement pin 8 penetrating the cam groove 5a is hanged across the lifters 11, 12. In opening and closing operations of the roof panel 3, especially in tilt-up (lift-up) and tilt-down (lift-down), because the engagement pin 8 receives a comparatively large reaction force from the cam groove 5a, a high intensity is requested for the lifters 11, 12 for supporting the pin 8. Therefore, in the embodiment the lifters 11, 12 are configured to be a plate member made of metal by press working. Other than the press working, the lifters 11, 12 may be formed by casting and the like.

Any of the lifters 11, 12 is a vertical face form, wherein engagement pin support portions 11a, 12a indicating a chevron in a side view are formed, and fixing holes 11b, 12b for fixing the engagement pin 8 are drilled in the support portions 11a, 12a, respectively. At front and rear of a lower edge of the engagement pin support portion 11a, toward the vehicle inside are extendedly and horizontally provided shoe connection portions 11c, respectively; at center of the lower edge of the support portion 11a, toward the vehicle outside is extendedly provided a shoe auxiliary connection portion 11d. At front and rear of a lower edge of the engagement pin support portion 12a, toward the vehicle outside are extendedly and horizontally provided shoe connection portions 12c, respectively;

The slide shoes 13, 14 are made of a resin-molded member. As shown in FIG. 2, on the upper portion near the vehicle outside in the roof panel guide portion 9b is compartmentalized an anchor groove 9d inserted in an anchor (not shown) for assisting pull-in and the like in closing the roof panel 3. To the extent that anchor groove 9d is formed, a slide space for the slide shoe 14 is formed low and as a thin member compared to the slide shoe 13.

As shown in FIG. 3, in the slide shoe 13 is formed a pair of rectangular lifter fixing holes 13a that are laterally wider and where the shoe connection portions 11c at the front and rear of the lifter 11 are horizontally inserted and fixed, respectively; in the slide shoe 14 is formed a pair of rectangular lifter fixing holes 14a that are laterally wider and where the shoe connection portions 12c at the front and rear of the lifter 12 are horizontally inserted and fixed, respectively.

At the front and rear of the slide shoe 14 are formed horizontal plate-like insertion portions 14b, respectively, as a pair toward the slide shoe 13, and on lower faces of the insertion portions 14b, claw-like hooks 14c are formed, respectively. Furthermore, in the slide shoe 14 is formed a lifter auxiliary fixing hole 14d where the shoe auxiliary connection portion 11d of the lifter 11 is inserted and fixed, and is further formed a cable fixing portion 14e connected and fixed to the push-pull cable 10. In the slide shoe 13 is formed a pair of insertion holes 13b where the insertion portions 14b are horizontally inserted and fixed, respectively, and on bottom faces of the insertion holes 13b are drilled lock holes 13c, respectively, for locking the hooks 14c.

Thus the shoe connection portions 11c are pressed into the lifter fixing holes 13a, respectively, and thereby, the lifter 11 is fixed to the slide shoe 13; the shoe connection portions 12c are pressed into the lifter fixing holes 14a, respectively, and thereby, the lifter 12 is fixed to the slide shoe 14. Then the insertion portions 14 are inserted in the insertion portions 13b, respectively, and the hooks 14c are locked in the lock holes 13c, respectively; thereby, the slide shoe 13 and the slide shoe 14 are connected with each other, and each lower portion of the lifter 11 and the lifter 12 is integrally supported.

When a slide space in the guide rail 9 is narrow and the section shape of the space is complicated, if it is directed to make a single slide shoe bear a good sliding function of a slide shoe matching the support function of the lifters 11, 12 and the section shape of the guide rail 9, the single slide shoe is required to be a complicated shape with a depression and a protrusion or a hole and the manufacturing yield ratio of the single slide shoe tends to be lowered; whereas, according to the present invention, because a slide shoe is divided into the slide shoes 13, 14 that integrate the lifters 11, 12 by being connected with each other, each shape of the slide shoes 13, 14 is simplified, and manufacturing them is easy.

Furthermore, by making the plate-form shoe connection portions 11c, 12c the structure of being inserted and fixed by being pressed into the lifter fixing holes 13a, 14a, respectively, it is easy to assemble the lifters 11, 12 in the slide shoes 13, 14, respectively. Moreover, in the embodiment, because the shoe auxiliary connection portion 11d of the lifter 11 is also inserted and fixed by being pressed into the lifter auxiliary fixing hole 14d, the combined rigidity of the lifters 11, 12 are stronger.

Figure 4:
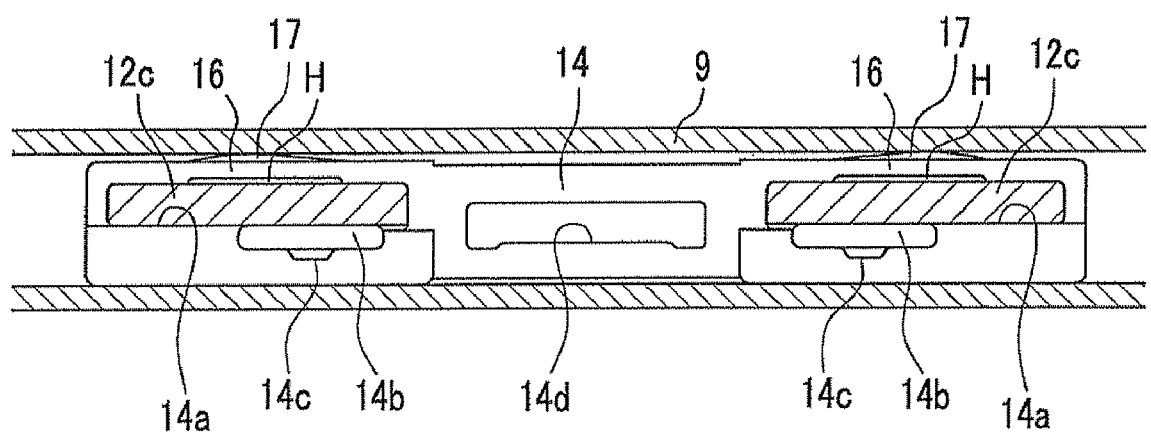
FIG. 4 is a side view of one slide shoe.

Next, as shown in FIG. 4 (side view of the slide shoe 4), in the lifter fixing holes 14a of the slide shoe 14 are provided bending spaces H, respectively, for releasing a bending in the up-to-down direction of the shoe 14 and caused by contact with the guide rail 9. Because the fixed roof 2 (FIG. 1) of a vehicle generally has a gradual curved surface, the guide rail 9 made of an extrusion mold material is bend-formed with a gradual curvature along the roof 2 in many cases; however, there is a case where the slide section spaces of the slide shoes 13, 14 are not uniform across the longitudinal direction of the rail 9 due to a forming error in the bend forming.

In addition to considering the forming error of the guide rail 9, in order to prevent the jounce of the slide shoes 13, 14 and achieve their smooth slidability, their upper portions are formed, as sown in FIG. 3, as plate-form elastic portions 15, 16 always contacted with the upper edge of the rail 9 by pressure. Specifically, protrusions 17 are protrudingly provided on upper faces of the slide shoes 13, 14, respectively, and are always contacted with an upper edge portion of the guide rail 9 by pressure; thereby, the jounce of the shoes 13, 14 is prevented, and thereat, the elastic portions 15, 16 acting as leaf springs are bent up and down in accord with the shape of the rail 9.

As described above, because the slide shoe 14 is a thin member, it is difficult to separately form a bending space of the elastic portion 16 in addition to fixing portions (lifter fixing holes 14a) of the lifter 12. On the other hand, as described above, in the lifter fixing holes 14a of the slide shoe 14 are provided the bending spaces H, respectively, for releasing a bending in the up-to-down direction of the shoe 14 and caused by contact with the guide rail 9, and thereby, thinning the shoe 14 can be achieved without damaging the function of the elastic portions 16. The bending spaces H are formed at upper-side center of the lifter fixing holes 14a, respectively, and are a space of a gap between each upper face of the connection portions 12c inserted in the holes 14a and each lower face of the elastic portions 16.

In the embodiment, because the slide shoe 13 is a member high in height, the elastic spaces H are compartmentalized from the lifter fixing holes 13a and provided separately therefrom; not to mention, the spaces H may be provided in the holes 13a.

Thus the best mode has been described. In the embodiment, although an inner-slide sunroof apparatus is described, the present invention is also applicable to an outer-slide sunroof apparatus.

What is claimed is:

1. A slider structure of a sunroof apparatus,
the apparatus comprising:
a roof panel configured to be attached to an opening of a fixed roof;
a panel support stay, where a cam groove is formed, configured to be fixed to a side edge of the roof panel; and
a slider configured to move along a guide rail, to be engaged with the cam groove through a pin, and to tilt and slide the roof panel,
the slider structure comprising:
a pair of lifters that interpose the panel support stay, are divided, and are engaged with the cam groove through the pin, wherein at least one lifter includes a shoe auxiliary portion extending from a centrally located lower edge thereof; and
a pair of slide shoes that are attached to the lifters, respectively, are connected with each other, integrate the lifters, and are slid on the guide rail, wherein at least one slide shoe includes a lifter auxiliary fixing hole defined therein, the shoe auxiliary portion being fixedly pressed into the lifter auxiliary fixing hole.

2. The slider structure according to claim 1, wherein in each of the lifters is formed a plate-form shoe connection portion extended in a horizontal direction; in each of the slide shoes is formed a lifter fixing hole where the shoe connection portion is horizontally inserted and fixed; and in the lifter fixing hole of at least the other slide shoe is provided a bending space for releasing a bending in an up-and-down direction of the slide shoe and caused by contact with the guide rail.

3. A slider structure of a sunroof apparatus, comprising:
a roof panel configured to be attached to an opening of a fixed roof;
a panel support stay, where a cam groove is formed, configured to be fixed to a side edge of the roof panel; and
a slider configured to move along a guide rail, to be engaged with the cam groove through a pin, and to tilt and slide the roof panel,
the slider structure comprising:
a pair of lifters that interpose the panel support stay, are divided, and are engaged with the cam groove through the pin; and
a pair of slide shoes that are attached to the lifters, respectively, are connected with each other, integrate the lifters, and are slid on the guide rail,
wherein in each of the lifters is formed a plate-form shoe connection portion extended in a horizontal direction; in each of the slide shoes is formed a lifter fixing hole where the shoe connection portion is horizontally inserted and fixed; and in the lifter fixing hole of at least one slide shoe is provided a bending space for releasing a bending in an up-and-down direction of the slide shoe and caused by contact with the guide rail.

* * * * *